(12) United States Patent　　(10) Patent No.:　　US 12,594,538 B2
　　Coe　　　　　　　　　　　　　(45) Date of Patent:　　　　Apr. 7, 2026

(54) CONTINUOUS PROCESSOR UTILIZING QUANTUM FIELD MICRO-VARIABLE PARTICLE INTERACTION

(71) Applicant: William B. Coe, Wrightwood, CA (US)

(72) Inventor: William B. Coe, Wrightwood, CA (US)

( * ) Notice: Subject to any disclaimer, the term of this patent is extended or adjusted under 35 U.S.C. 154(b) by 691 days.

(21) Appl. No.: 17/997,818

(22) PCT Filed: Apr. 28, 2021

(86) PCT No.: PCT/US2021/029728
　　§ 371 (c)(1),
　　(2) Date: Nov. 2, 2022

(87) PCT Pub. No.: WO2021/225848
　　PCT Pub. Date: Nov. 11, 2021

(65) Prior Publication Data
　　US 2023/0201792 A1　　Jun. 29, 2023

Related U.S. Application Data

(60) Provisional application No. 63/021,585, filed on May 7, 2020, provisional application No. 63/038,698, filed on Jun. 12, 2020.

(51) Int. Cl.
　　*C08J 11/10*　　　　(2006.01)
　　*B01J 19/28*　　　　(2006.01)
　　　　　　　　(Continued)

(52) U.S. Cl.
　　CPC ............. *B01J 19/285* (2013.01); *B29B 7/483* (2013.01); *B29B 7/7495* (2013.01); *B29C 48/14* (2019.02);
　　　　　　　　(Continued)

(58) Field of Classification Search
　　CPC ........ C08J 11/10; C08J 11/04; C08J 2317/00; B29C 48/14; B29C 48/144; B29C 48/25; B29C 48/40; B29C 48/405
　　See application file for complete search history.

(56) References Cited

U.S. PATENT DOCUMENTS 5,284,625 A * 2/1994 Isayev ...................... B01J 19/20
　　　　　　　　　　　　　　　　　521/45.5
5,851,065 A 12/1998 Ikeda et al.
　　　　　　(Continued)

FOREIGN PATENT DOCUMENTS

CN　　1768993 A * 5/2006
CN　　2829955 Y * 10/2006
　　　　　(Continued)

OTHER PUBLICATIONS

RU-2489455-C1 (Aug. 10, 2013); machine translation. (Year: 2013).*
　　　　　(Continued)

*Primary Examiner* — Rip A Lee
(74) *Attorney, Agent, or Firm* — Knobbe, Martens, Olson & Bear, LLP

(57)　　　　　ABSTRACT

Continuous processing equipment is suitable for use in the preparation of elastomeric compositions from end-of-life tire crumb or other vulcanized rubber starting materials. A reactor includes an outer barrel, a first shaft and a second shaft, and one or more piezoelectric transducer-driven acoustic horns arranged along the outer barrel and penetrating the outer barrel through a series of vibration-isolated ports which traverse a jacket of the outer barrel.

18 Claims, 5 Drawing Sheets

(51) Int. Cl.

| | | |
|---|---|---|
| *B29B 7/48* | (2006.01) |
| *B29B 7/74* | (2006.01) |
| *B29C 48/14* | (2019.01) |
| *B29C 48/40* | (2019.01) |
| *B29C 48/405* | (2019.01) |
| *B29C 48/57* | (2019.01) |
| *C08J 11/04* | (2006.01) |
| *B29C 48/25* | (2019.01) |

(52) U.S. Cl.
CPC ............ *B29C 48/405* (2019.02); *B29C 48/57* (2019.02); *C08J 11/04* (2013.01); *C08J 11/10* (2013.01); *B29C 48/25* (2019.02); *C08J 2321/00* (2013.01)

(56)  References Cited

U.S. PATENT DOCUMENTS

| | | | | |
|---|---|---|---|---|
| 5,955,035 | A * | 9/1999 | Dinzburg | ............... B29B 13/08 425/174 |
| 6,095,440 | A * | 8/2000 | Roberson | ............... B29B 17/04 241/DIG. 31 |
| 6,545,060 | B1 * | 4/2003 | Ruhman | ................ B29B 17/00 264/912 |
| 9,714,333 | B2 * | 7/2017 | Isayev | .................. B29C 48/142 |
| 10,626,275 | B2 | 4/2020 | Coe | |
| 2014/0163129 | A1 | 6/2014 | Isayev | |
| 2019/0055383 | A1 | 2/2019 | Coe | |
| 2020/0024433 | A1 | 1/2020 | Coe | |

FOREIGN PATENT DOCUMENTS

| | | | | | |
|---|---|---|---|---|---|
| CN | 214163930 | U | * | 9/2021 | |
| EP | 0 526 987 | | | 2/1993 | |
| EP | 0612603 | A1 | * | 8/1994 | ............ B29C 48/14 |
| JP | 2019-181913 | | | 10/2019 | |
| RU | 2489455 | C1 | * | 8/2013 | |

OTHER PUBLICATIONS

CN-2829955-Y (Oct. 25, 2006); machine translation. (Year: 2006).*
CN-1768993-A (May 10, 2006); machine translation. (Year: 2006).*
EP-0612603-A1 (Aug. 31, 1994); machine translation. (Year: 1994).*
CN-214163930-U (Sep. 10, 2021) (Year: 2021).*
International Search Report and Written Opinion dated Aug. 19, 2021 in application No. PCT/US2021/029728.

* cited by examiner

5003

5001

5002

CONTINUOUS PROCESSOR UTILIZING QUANTUM FIELD MICRO-VARIABLE PARTICLE INTERACTION

INCORPORATION BY REFERENCE TO RELATED APPLICATIONS

Any and all priority claims identified in the Application Data Sheet, or any correction thereto, are hereby incorporated by reference under 37 CFR 1.57. This application is the U.S. National Phase of International Application No. PCT/US2021/029728 filed Apr. 28, 2021, which claims the benefit of U.S. Provisional Application No. 63/021,585, filed May 7, 2020, and U.S. Provisional Application No. 63/038,698, filed Jun. 12, 2020. Each of the aforementioned applications is incorporated by reference herein in its entirety, and each is hereby expressly made a part of this specification.

FIELD

Continuous processing equipment suitable for use in the preparation of elastomeric compositions from end-of-life tire crumb or other vulcanized rubber starting materials is provided.

SUMMARY

The elements of nature reach practical applications through segregation, size reduction, mixing and reacting by intelligent progressions. Often times more complex application results require multiple, layered tactical progressions as the materials being handled move from readily visible, less reactive particle sizes to near invisible, very reactive atomic scale particle sizes.

Today's modern, continuous processing equipment (CPE) may be categorized as principally mixers or mixer-extruders. The mixer exhibits a near ambient pressure at the exit of the process but may have very high pressures exerted upon the materials being compounded within the process. In contrast, the mixer-extruder may embody all the attributes of the mixer but yield a final compound that may be squeezed into a mold at several thousand psi. This innovation can be categorized as a mixer-extruder.

A drive motor, torque multiplying gearbox, and splitter drive from a single shaft to two shafts is the common configuration driving the working stages of CPE. Counter rotating shafts housed within a barrel produce large shearing and pushing forces between the shafts with higher wear in the outer static surface while co-rotating shafts typically have equal shearing but lower pushing pressure between the shafts with noticeably lower wear on the outer barrel surface. This CPE innovation utilizes co-rotating shafts.

CPE, mechanical configurations have transfer spirals pushing material through intersecting lobes of various configurations arranged upon the shafts at intervals that allow a progression of size reduction, dispersion and distribution of either the original additives metered into the stuffing box at the beginning or additional materials to be added during the journey through the barrel. The barrel can be smooth or be built in stages with internal flutes and protrusions that enhance the processing efficiency.

Cooling and or heating jackets to the CPE barrel assembly are industry standards which allow a close control of thermally induced chemical reactions. Ports along the length of CPE barrel are common for facilitating vacuum, catalyst addition, electromagnetic interventions, etc. Powdered, liquid and/or gaseous state materials may all be successfully compounded through CPE. Horsepower required by CPE is directly proportional to an increase in the number of stages, throughput rate and shearing-feed pressure requirements.

The CPE of the embodiments can advantageously be employed to regenerate a monolithic, macro-structural, interpenetrating elastomer network morphology from Ground Tire Particles (GTP) or other vulcanized rubber particles using an OrganoMetallic Compound (OMC) such as copper acetate. Descriptions of the crumb rubber particles and organometallic compounds can be found in U.S. Pat. No. 10,626,275, U.S. Publication No. 2020/0024433 A1, and U.S. Publication No. 2019/0055383 A1. For example, the CPE can be employed to prepare a modified rubber by introducing a mixture (e.g., an aqueous or nonaqueous slurry or a dry mixture) comprising vulcanized rubber particles and an organometallic compound into the CPE. In the CPE, delamination of a rubber matrix within the vulcanized rubber particles as coordinated with disrupting sulfidic linkages can occur, and sulfidic linkages can be reestablished to establish within the matrix sulfur bridge cross linked, re-aligned, laminates. The resulting product can have an unbound, reptated internal morphology, wherein a portion of the rigid sulfidic linkages therein are each tethered at an original allylic carbocation and unbound at an original methyl carbocation or substituted there by an acetate moiety. Delamination can be associated with a portion of rigid sulfidic bridges of the vulcanized rubber particles becoming unbound at an original methyl carbocation while remaining tethered at an original allylic carbocation. The organometallic compound comprises a metal having octahedral molecular geometry, e.g., a metal ion selected from the group consisting of $Co^{2+}$, $Cu^{2+}$, $Ni^{2+}$, $Zn^{2+}$, and $Mn^{2+}$. The organometallic compound can have, e.g., an organic anion as a ligand to the metal ion, e.g., the organic anion can comprise acetate ion. The organometallic compound can be copper acetate. The organometallic compound can be a metal salt that undergoes a phase change from solid to liquid or vapor in a range of 100-150° C. A temperature in the CME can be maintained at ambient by use of a cooling jacket or cooling coils. The vulcanized rubber crumbs can have a particle size greater than 200 mesh, or smaller. A rubber-containing product from the continuous mixing equipment (CME, sometimes referred to as continuous processing equipment or CPE) can be used as a raw material in the manufacture of engineered rubbers, tires (e.g., tread and/or sidewalls), alone or in combination with virgin rubber or other elastomers. The resulting material can be employed in other applications wherein virgin rubber is typically employed, e.g., black masterbatch, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, molding or the like.

Accordingly, in a first aspect a reactor is provided comprising: an outer barrel; a first shaft and a second shaft, which cooperate as twin shafts, wherein each shaft is adapted to accept a slide on-and-off spiral transfer flight and one or more elliptical mixing lobes, wherein each lobe of the first shaft is paired with a lobe on the second shaft, rotating lobes create pressure impingement upon the mixture as it progresses through the co-rotating reactor; and one or more piezoelectric transducer driven acoustic horns arranged along the outer barrel and penetrating the outer barrel through a series of vibration-isolated ports which traverse a jacket of the outer barrel; wherein, in operation, the reactor is adapted to provide a coordinated, substantial increase in mechanical stress-strain, rate of shearing, and pulsed-timed micro-mechanical stress-stain, that is modulated by an inter-secting, variable, high frequency acoustic, quantum field generated in the device by the one or more piezoelectric transducer driven acoustic horns.

In an embodiment of the first aspect, the piezoelectric transducer driven acoustic horns are adapted to operate in a frequency range of 1000 Hz to 50000 Hz.

In an embodiment of the first aspect, the piezoelectric transducer driven acoustic horns are adapted to deliver 20000 to 50000 pulses per second, optionally 30,000 pulses per second.

In an embodiment of the first aspect, each shaft supports 10 or more lobes.

In an embodiment of the first aspect, each shaft supports 12 lobes.

In an embodiment of the first aspect, a gap between a lobe tip and the outer barrel 0.01 inches to 0.1 inches, optionally 0.05 inches.

In an embodiment of the first aspect, each lobe comprises at least one lug, wherein a closure gap between a raised surface of the at least one lug and the lobe tip is from 0.10 inches to 0.15 inches.

In an embodiment of the first aspect, the reactor further comprises an operating motor, optionally adapted to operate at a speed of 3,500 rpm, wherein power is driven through a gearbox to one or more of the shafts, optionally wherein the gearbox is a 17:1 gearbox adapted to rotate the one or more of the shafts at 205 rpm.

In an embodiment of the first aspect, the paired lobes, when rotating, are adapted to create pressure impingement upon a mixture as it progresses through the reactor.

In an embodiment of the first aspect, in operation, pressure is applied to a mixture of particles passing through the reactor in a series of pulses, wherein each particle of the mixture encounters 120000 or more pulses in passing through the reactor.

In a second aspect is provided a method of processing reactant coated, ground rubber particles, comprising: providing vulcanized ground rubber particles with an average diameter of 600 micron, wherein the ground rubber particle is in combination with a reactant; feeding the combination of the vulcanized ground rubber particles and the reactant through the reactor of the first aspect or any of its embodiments; and recovering reacted rubber particles having an average diameter of from 500 nm-10 microns.

In an embodiment of the second aspect, the reactant is an organometallic compound, optionally copper acetate.

In an embodiment of the second aspect, the vulcanized ground rubber particles are derived from an end-of-life tire.

In a third aspect, an apparatus substantially as described herein is provided.

In a fourth aspect, a product produced by an apparatus substantially as described herein is provided.

In a fifth aspect, a product substantially as described herein is provided.

Any aspect or embodiment, or feature of any aspect or embodiment, may be combined, in whole or in part, with one or more other aspects or embodiments. Any feature of an aspect or embodiment may be omitted from the aspect or embodiment, or considered optional to the aspect or embodiment.

DETAILED DESCRIPTION

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The illustrative embodiments described in the detailed description, drawings, and claims are not meant to be limiting. The teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspect and that two or more of these aspects may be combined in various ways. For example, a system or apparatus may be implemented or a method may be practiced by one of skill in the art using any reasonable number or combination of the aspects set forth herein. In addition, such a system or apparatus may be implemented or such a method may be practiced using other structure, functionality, or structure and functionality in addition to or other than one or more of the aspects set forth herein. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure. It is to be understood that the disclosed embodiments are not limited to the examples described below, as other embodiments may fall within disclosure and the claims.

Mechanical Platform

Figure 1A:
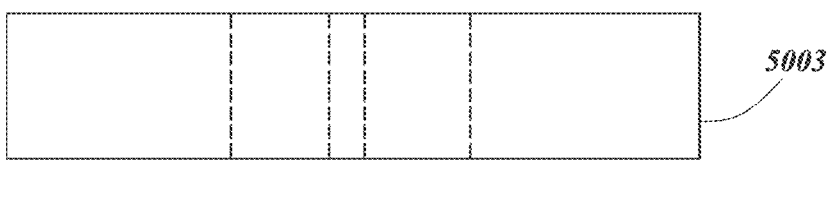
FIG. 1A depicts a standard mixing lobe design including a first lobe 5001 with side view 5003, and a second lobe 5002.
Figure 1A:
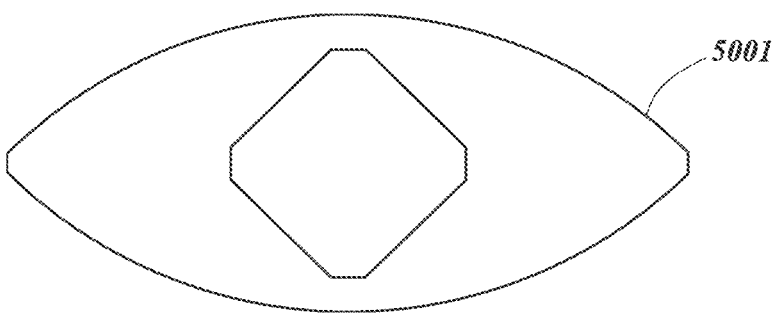
Figure 1A:
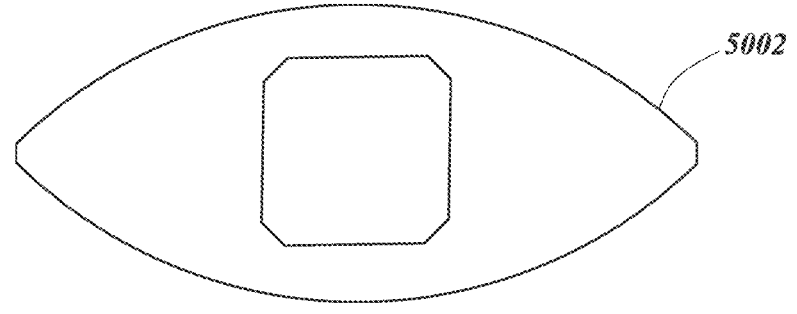

The CPE base design is a 5"×36", twin shaft, counter-rotating device powered by a 20 hp, 480 v, 3 ph motor manufactured by Teledyne Readco in York, Pa., now known as Kurimoto Readco. The twin shafts are configured to accept slide on-and-off spiral transfer flights and 1" thick elliptical mixing lobe pairs (FIG. 1A) typically made of corrosion resistant, 304 stainless steel or Hastelloy steel.

The spiral and lobe work appliances match to orchestrate the movement and compounding action desired for a particular material, whether it be a power-liquid, powder-powder, or liquid-liquid medium. Square shaft openings in the individual appliances are oriented at 90 degrees or 45 degrees such that when mounted in an alternating position on the shaft(s) they provide a helical progression of pushing or mixing of the material from the barrel entrance, known as a stuffing box, to and through the barrel exit which may be a free flowing or regulated gate.

Figure 1B:
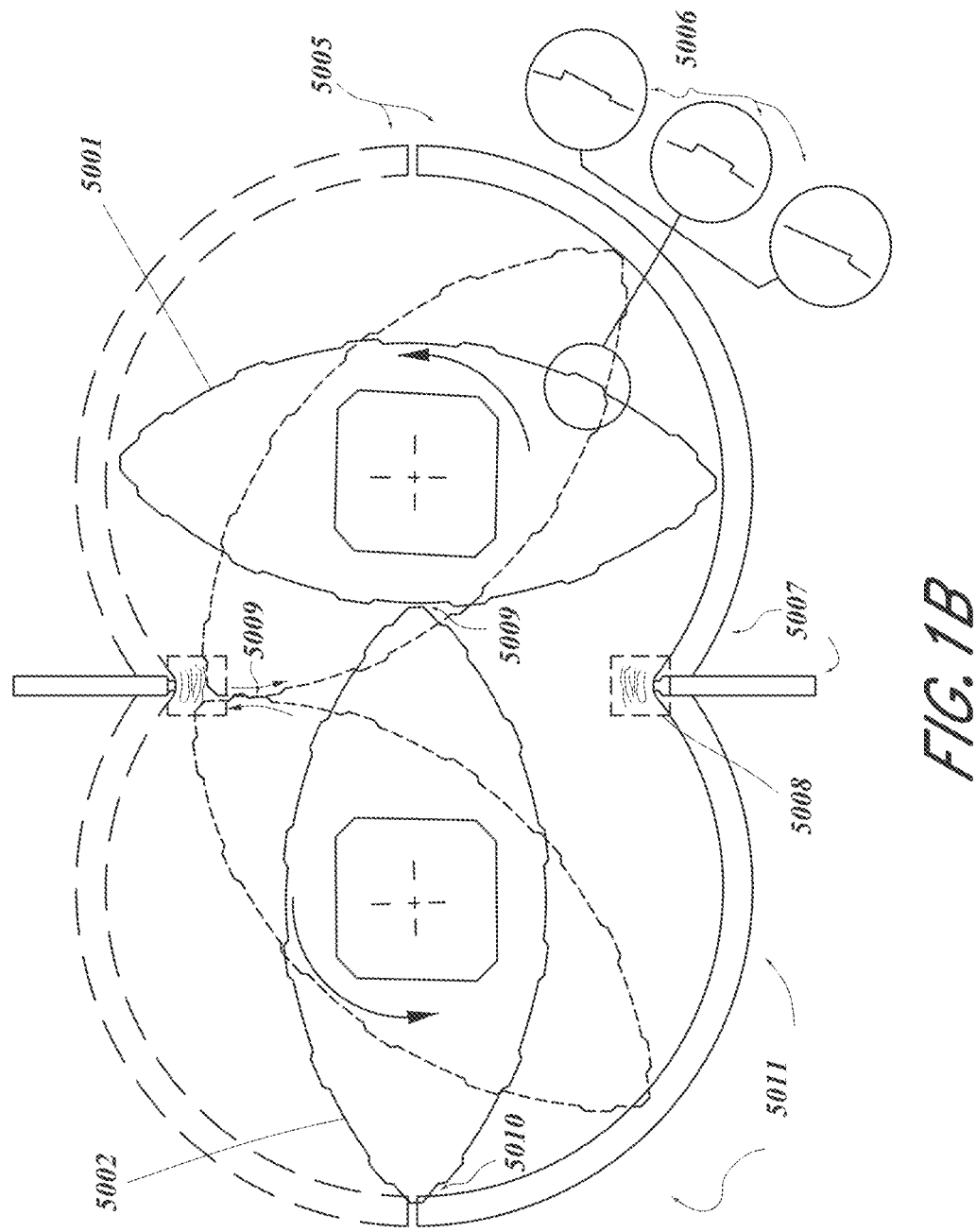
FIG. 1B depicts a modified lobe design and a modified barrel design. The design includes a first lobe 5001 and a second lobe 5002. The barrel (jacketed barrel 5011) is a two piece clamshell barrel 5005. Three alternative Stress-Strain Lug (SSL) designs 5006 are depicted. Piezoelectric transducer driven acoustic horns 5007 are provided, which are associated with an area of quantum field activity 5008. The gap 5009 between paired lobes is 0.015" and the gap 5010 between a lobe and the barrel is 0.050".
Figure 1C:
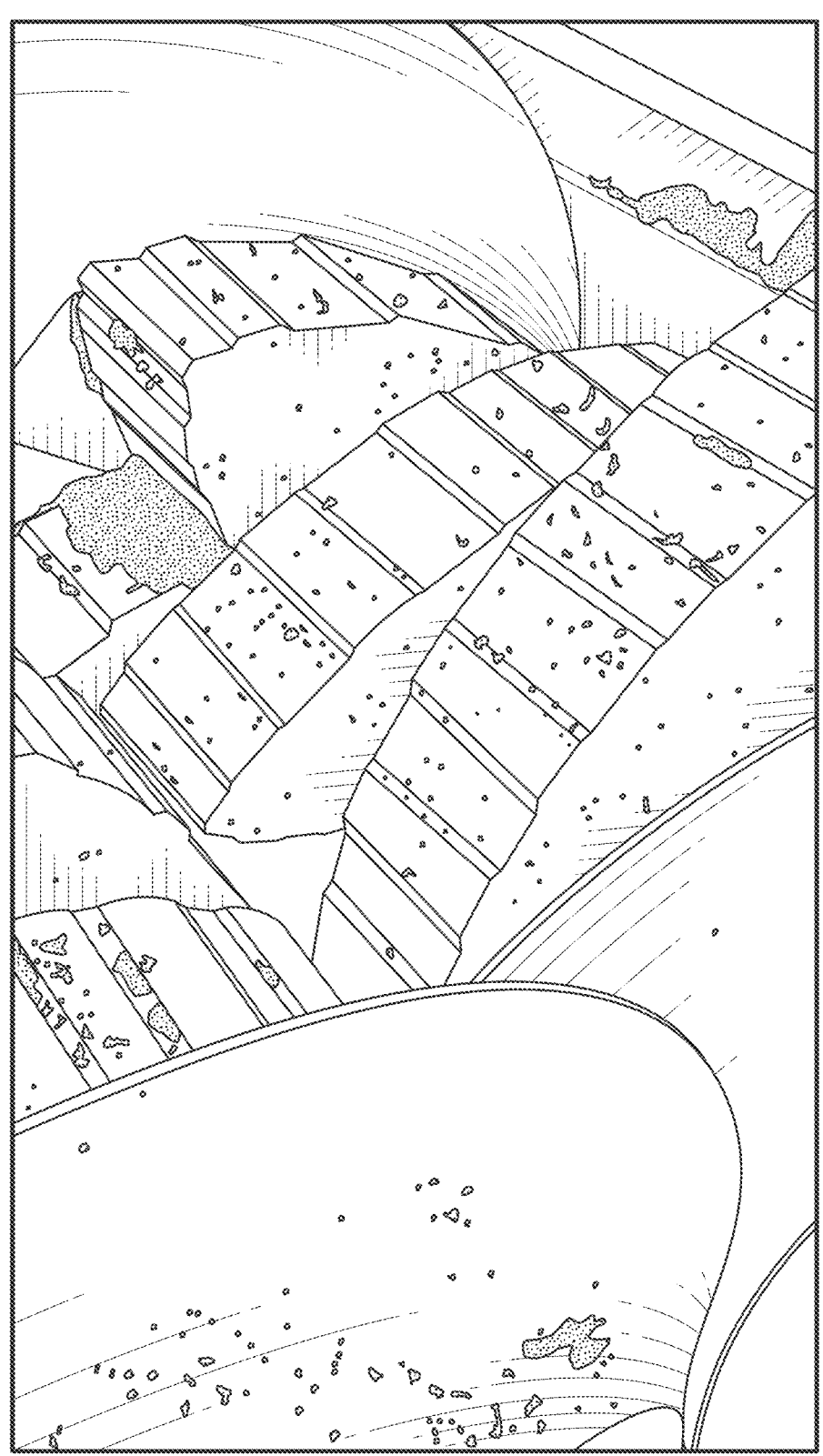
FIG. 1C is a photograph showing details of the paired lobes of the CPE.

Typical, original sweep clearances between the barrel surface and the rotating surfaces of the outer circumference of the spiral flights and/or the tips of the rotating lobe(s) is in the range of 0.050"-0.060", dependent upon the materials being processed; however, larger or smaller clearances can be employed. Clearances between the moving surfaces of the intermeshing lobes is usually closer than between the rotating surfaces and the barrel, for example, in the range of 0.040"-0.050" (FIG. 1B). FIG. 1C is a photograph showing details of the intermeshing lobes.

Figure 1D:
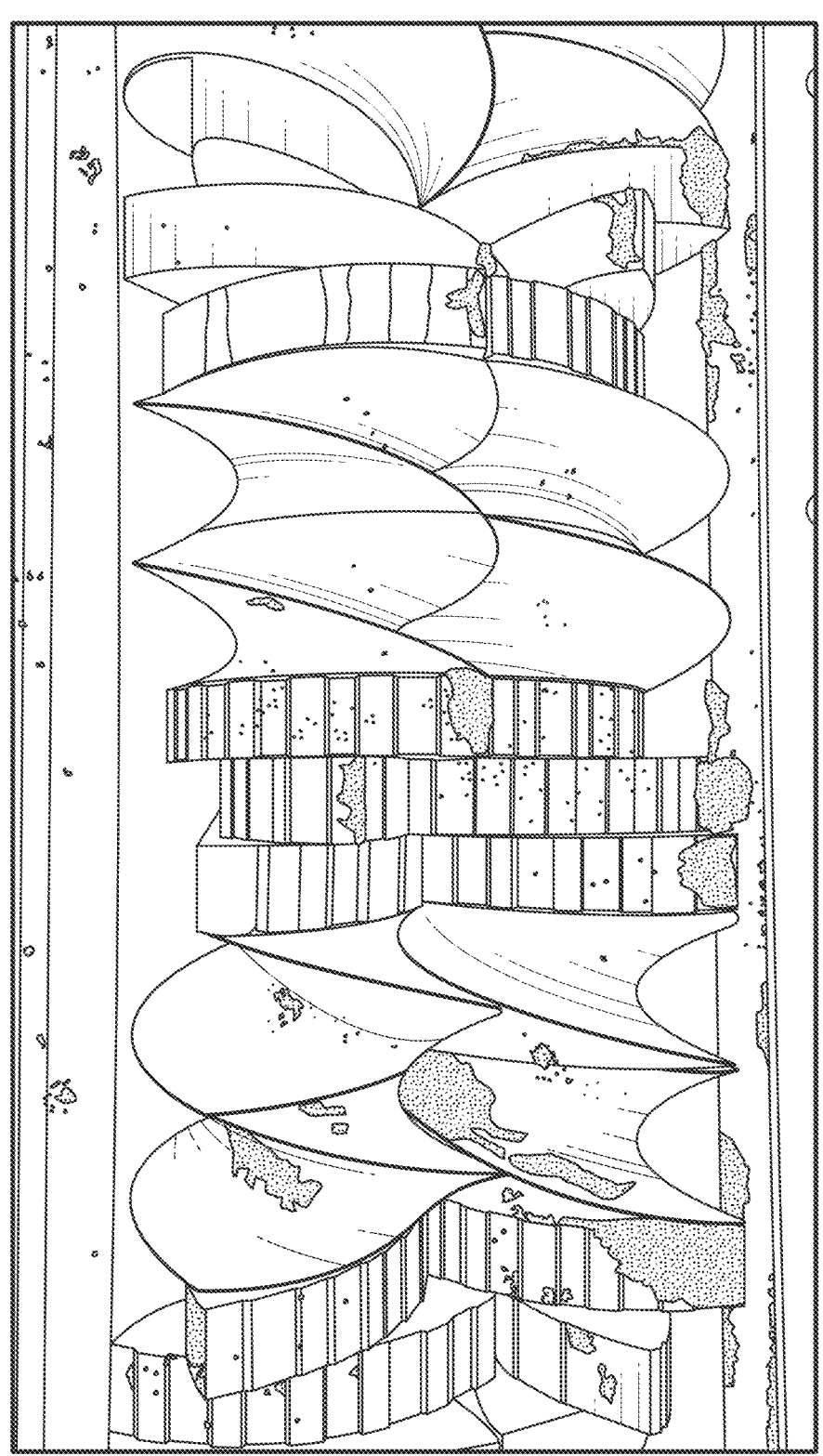
FIG. 1D is a photograph of the CPE with half of the clamshell barrel removed, exposing the interior and showing the arrangement of lobes and rotating screws.
Figure 1E:
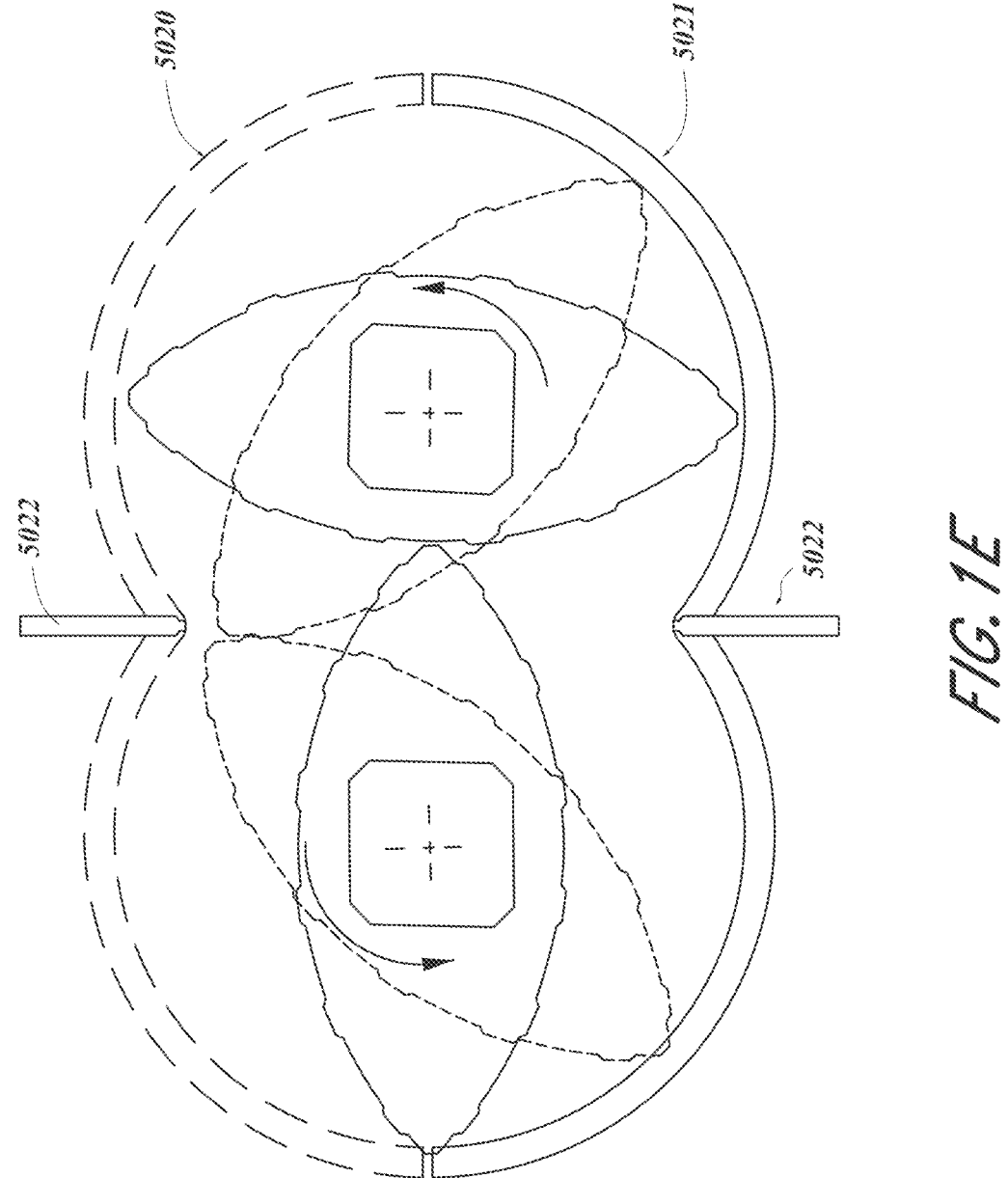
FIG. 1E depicts a modified lobe design and a modified barrel design similar to that depicted in FIG. 1B, showing the engagement of the lobes 5001 and 5002. The design includes an upper one-half reactor tunnel 5020, a lower one-half reactor tunnel 5021, ultrasonic transducers 5022, and alternating ports (not depicted) at upper and lower work positions for liquid nitrogen injection. The liquid nitrogen mitigates, by cold temperature embrittlement, the otherwise flexible ground tire rubber particle. This achieves quicker and more complete size reduction when coordinated with the ultrasonic transducer pulses from the piezoelectric transducer driven acoustic horns.

The current barrel design is typically made of corrosion resistance 304 stainless steel with a chrome inner surface. It is a clamshell configuration and provides thermal control of the process through full length and circumference jacketing. FIG. 1D is a photograph showing details of the spiral flights and the rotating lobes as seated in half of the barrel.

Modified Mechanical Platform

This innovation consists of two primary modifications to the CPE base design. The design modifications are mutual, reciprocal and complimentary to achieve Atomic-Scale, Particle Interaction (ASPI). The ASPI is achieved by (ONE) a coordinated, substantial increase in: 1) mechanical stress-strain, 2) rate of shearing, 3) pulsed-timed micro-mechanical stress-stain, all modulated by (TWO) an intersecting, variable, high frequency acoustic, quantum field.

ONE consists of providing a series of raised lugs across the width of the original lobe design (FIG. 1B). These are referred to as stress-strain lugs (SSLs) The height and shape of the lug can vary depending upon the material being processed. Its construction can be achieved by machining the profile desired from a raw blank lobe; three alternatives are shown. Typically, the barrel-to-lobe gap remains the same as the Original Equipment Manufacture (OEM) design. The lobe-tip-to-lug, primary surface can also remain the same as the OEM design, but the closure gap between the raised surface of the lug and the lobe tip can be in the range of 0.10"-0.15"; however higher or lower closure gaps can be employed. The number of lobes and the shape are empirically established, and can vary depending upon application, e.g., 1, 2, 3, 4, 5, 6, 7, 8, 9, 10 or more lobes.

TWO consists of the insertion of piezoelectric transducer driven acoustic horn(s) arranged along the outer barrel and penetrating the barrel through a series of vibration-isolated ports which traverse the barrel jacket and are located at positions selected to strategically influence the ASPI. The high frequency emitters (HFE) operate in the range of 1,000-50,000 Hz.

Operating Quanta—ONE the SSL

The following discussion is in the context of processing a coated, ground rubber particle (GRP) with a beginning average diameter of 600 microns and an intended, exiting final diameter in the range of 500 nm -10 microns.

At an operating motor speed of 3,500 rpm driven through a 17:1 gearbox the shaft(s) rate of rotation is 205 rpm (however, higher or lower rpm can be employed in certain embodiments). With the shaft-pair configuration of three sets of three pairs of lobes (workstations) pressurized by the forward-squeezing, transfer spirals along the 36" length of the CPE; the number of pulsed, SSL interactions between the Ground Rubber Particle (GRP) and the lugs is 44,280/min.

The spiral feed system, with no workstations or exit valving will, at 205 shaft rpm, free flow approximately 200 pounds per minute of free flowing GRP. With workstations as described herein and a gate valve at the exit, a 20 hp motor will move about 20 pounds of processed GRP. This equates to subjecting the bulk rubber particle to 442,800 SSLs/min.

Operating Quanta—TWO the HFE

Six HFE located three above and three below (FIG. 1B) per workstation, emitting ca 30,000 pulses per second, provides an accelerated chemical bond disruption.

Quantum Field—Manipulating Intricate Entanglement of Competing Coherent Quanta The "Area of Quantum Field Activity" (CPE Drawing #2) is a Particle Vortex Cavity (PVC) which is formed by the confluence of the flow of materials along three axis within the CPE barrel: 1) a push-flow from the spiral feed flights which is parallel to the annular cavity axis of the barrel, 2) an upward sweeping motion induced by the left hand CCR lobe perpendicular to the axial push-flow of (1) and 3) a downward sweeping motion induced by the right hand CCR lobe, also perpendicular to the axial push-flow but opposing the flow of (2). Positioning a three HFE acoustic horns (sonotrode) cluster to radiate an acoustic wave into the PVC directly below and above the three lobe workstation creates an opportunity to significantly influence efficiency of the mixing, chemical reaction(s) and size-dissociation of the materials being processed.

Cavitation Induced Electromagnetic Field

The GRP being subjected to the CPE (by way of example) is pre-coated in a separate operation, prior to being fed into the CPE, with a water based solution containing a chemically reactive additive. The cluster-timed, HFE propagated ultra-sonic wave will travel through air space between the particles and, upon striking innumerable particle surface(s), interact with the water component of the coating thereby forming a cavitation bubble. The formation, growth and sudden collapse of the bubble forms a shockwave. The collapsing bubble shockwave operates at super-sonic speed. The HFE ultra-sonic wave and the particles, both upstream and downstream of the bubble collapse, are moving at sub-sonic speed. This flow of materials around the collapsing bubble are considered isentropic, i.e., they satisfy the Rankine-Hugoniot conditions, and therefore the supersonic shockwave is as adiabatic process transferring no heat or mass between an otherwise thermodynamic system.

The sudden nature of the cavitation shockwave relative to the conditions within which it occurs in the PVC provides an overlapping, electrodynamic force which may be engineered as to amplitude and frequency by tuning the HFE wavelength and timing. One critical measurement of the HFE efficiency is the comparison of the final particle size emitted from the CPE measured against the power consumed by the main CPE drive train. A higher ratio of small particles to constant power consumption is a bulk indication that the settings of HFE by tuning is optimizing its influence.

EXAMPLE

In an exemplary embodiment, the rubber and a reactant are dropped into a stuffing box of a co-rotating reactor where it is pushed, under pressure through an annular cavity whereupon a series of rotating lobes create a high pressure impingement upon the coated rubber as it progresses through the annular reactor structure.

The surface of the rotating lobes of the reactor are outfitted with compression bars which subject the rubber to very high pressure pulses. The temperature momentarily rises to over 200° C. at the peak pressure, then subsides until the next compression bar is encountered. During the approx. 36 inches of travel from the stuffing box to the opposite end of the reactor journey, each rubber particle encounters upwards of 120,000 such pulses.

In certain embodiments, a twin shaft, co-rotating mixer extruder including elliptical-shaped lobes can be employed. In one embodiment, the mixer extruder includes twelve (12) equally spaced raised, ladder type bar/lugs machined onto the circumference of the lobe such that as the lobes pass over the respective profile of the opposing lobe the mixture is impinged into a 0.010" nip for about ¼" of the travel. The twenty-four pulses per revolution provided in such a mixer extruder help to open up the partially de-linked rubber particle and drive the reactant deeper into the GTR morphology until it reaches a desired size and reduced cross-link density. Any suitable number of lobes can be provided, e.g., fewer than 12 or more than 12, e.g., 6-24 lobes, 3-36 lobes, etc. Other nip distances can also be employed, e.g., 0.005" to 0.1", 0.005" to 0.05". Other distance of travel can be employed as well, e.g., ⅛" to ½", ⅙" to ⅓", etc.

Exemplary Embodiments

Reactor 1: A reactor comprising: an outer barrel; a first shaft and a second shaft, which cooperate as twin shafts, wherein each shaft is adapted to accept a slide on-and-off spiral transfer flight and one or more elliptical mixing lobes, wherein each lobe of the first shaft is paired with a lobe on the second shaft, rotating lobes create pressure impingement upon the mixture as it progresses through the co-rotating reactor; and one or more piezoelectric transducer driven acoustic horns arranged along the outer barrel and penetrating the outer barrel through a series of vibration-isolated ports which traverse a jacket of the outer barrel; wherein, in operation, the reactor is adapted to provide a coordinated, substantial increase in mechanical stress-strain, rate of shearing, and pulsed-timed micro-mechanical stress-stain, that is modulated by an intersecting, variable, high frequency acoustic, quantum field generated in the device by the one or more piezoelectric transducer driven acoustic horns.

Reactor 2: Reactor 1, wherein the piezoelectric transducer driven acoustic horns are adapted to operate in a frequency range of 1000 Hz to 50000 Hz.

Reactor 3: Reactor 1, wherein the piezoelectric transducer driven acoustic horns are adapted to deliver 20000 to 50000 pulses per second, optionally 30,000 pulses per second.

Reactor 4: Reactor 1, wherein each shaft supports 10 or more lobes.

Reactor 5: Reactor 1, wherein each shaft supports 12 lobes.

Reactor 6: Reactor 1, wherein a gap between a lobe tip and the outer barrel 0.01 inches to 0.1 inches, optionally 0.05 inches.

Reactor 7: Reactor 1, wherein each lobe comprises at least one lug, wherein a closure gap between a raised surface of the at least one lug and the lobe tip is from 0.10 inches to 0.15 inches.

Reactor 8: Reactor 1, further comprising: an operating motor, optionally adapted to operate at a speed of 3,500 rpm, wherein power is driven through a gearbox to one or more of the shafts, optionally wherein the gearbox is a 17:1 gearbox adapted to rotate the one or more of the shafts at 205 rpm.

Reactor 9: Reactor 1, wherein the paired lobes, when rotating, are adapted to create pressure impingement upon a mixture as it progresses through the reactor.

Reactor 10: Reactor 1, wherein, in operation, pressure is applied to a mixture of particles passing through the reactor in a series of pulses, wherein each particle of the mixture encounters 120000 or more pulses in passing through the reactor.

Method 11: A method of processing reactant coated, ground rubber particles, comprising: providing vulcanized ground rubber particles with an average diameter of 600 micron, wherein the ground rubber particle is in combination with a reactant; feeding the combination of the vulcanized ground rubber particles and the reactant through the reactor of any one of claims 1-10; and recovering reacted rubber particles having an average diameter of from 500 nm-10 microns.

Method 12: Method 11, wherein the reactant is an orgametallic compound, optionally copper acetate.

Method 13: Method 11 or 12, wherein the vulcanized ground rubber particles are derived from an end-of-life tire.

Apparatus 14: An apparatus substantially as described herein.

Product 15: A product produced by an apparatus substantially as described herein.

Product 16: A product substantially as described herein.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

As used in the claims below and throughout this disclosure, by the phrase "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration. Moreover, the operations and suboperations of various methods described herein are not necessarily limited to the order described or shown in the figures, and one of skill in the art will appreciate, upon studying the present disclosure, variations of the order of the operations described herein that are within the spirit and scope of the disclosure.

In addition, the operations and sub-operations of methods described herein may be carried out or implemented, in some cases, by one or more of the components, elements, devices, modules, circuitry, processors, etc. of systems, apparatuses, devices, environments, and/or computing modules described herein and referenced in various of figures of the present disclosure, as well as one or more subcomponents, elements, devices, modules, processors, circuitry, and the like depicted therein and/or described with respect thereto. In such instances, the description of the methods or aspects thereof may refer to a corresponding component, element, etc., but regardless of whether an explicit reference is made, one of skill in the art will recognize upon studying the present disclosure when the corresponding component, element, etc. may be used. Further, it will be appreciated that such references do not necessarily limit the described methods to the particular component, element, etc. referred to. Thus, it will be appreciated by one of skill in the art that aspects and features described above with respect to components, elements, devices, modules, and circuitry, etc., including variations thereof, may be applied to the various operations described in connection with methods described herein, and vice versa, without departing from the scope of the present disclosure.

What is claimed is:

1. A reactor comprising:
an outer barrel;
a first shaft and a second shaft, which cooperate as twin shafts, wherein each shaft accepts a slide on-and-off spiral transfer flight and one or more elliptical mixing lobes, wherein each lobe of the first shaft is paired with a lobe on the second shaft, rotating lobes create pressure impingement upon a mixture as it progresses through the reactor; and
one or more piezoelectric transducer driven acoustic horns arranged along the outer barrel and penetrating the outer barrel through one or a series of vibration-isolated ports which traverse a jacket of the outer barrel;
wherein, in operation, the reactor provides a coordinated, substantial increase in mechanical stress-strain, rate of shearing, and pulsed-timed micro-mechanical stress-stain, that is modulated by an intersecting, variable, high frequency acoustic, quantum field generated in a device by the one or more piezoelectric transducer driven acoustic horns.

2. The reactor of claim 1, wherein the one or more piezoelectric transducer driven acoustic horns operates in a frequency range of 1000 Hz to 50000 Hz.

3. The reactor of claim 1, wherein the one or more piezoelectric transducer driven acoustic horns delivers 20000 to 50000 pulses per second.

4. The reactor of claim 1, wherein each shaft supports 10 or more lobes.

5. The reactor of claim 1, wherein each shaft supports 12 lobes.

6. The reactor of claim 1, wherein a gap between a lobe tip and the outer barrel is 0.01 inches to 0.1 inches.

7. The reactor of claim 6, wherein the gap between the lobe tip and the outer barrel is 0.05 inches.

8. The reactor of claim 1, wherein each lobe comprises at least one lug, wherein a closure gap between a raised surface of the at least one lug and a lobe tip is from 0.10 inches to 0.15 inches.

9. The reactor of claim 1, further comprising:
an operating motor, wherein power is driven through a gearbox to at least one of the first shaft and the second shaft.

10. The reactor of claim 1, wherein paired lobes, when rotating, create pressure impingement upon a mixture as it progresses through the reactor.

11. The reactor of claim 1, wherein, in operation, pressure is applied to a mixture of particles passing through the reactor in a series of pulses, wherein each particle of the mixture encounters 120000 or more pulses in passing through the reactor.

12. A method of processing a reactant coated, vulcanized ground rubber particle, comprising:
providing vulcanized ground rubber particles with an average diameter of 600 micron, wherein the ground rubber particles are in combination with a reactant;
feeding a combination of the vulcanized ground rubber particles and the reactant through the reactor of claim 1; and
recovering reacted rubber particles having an average diameter of from 500 nm to 10 microns.

13. The method of claim 12, wherein the reactant is an organometallic compound.

14. The method of claim 13, wherein the organometallic compound comprises copper acetate.

15. The method of claim 12, wherein the vulcanized ground rubber particles are derived from an end-of-life tire.

16. The reactor of claim 3, wherein the one or more piezoelectric transducer driven acoustic horns delivers 30000 pulses per second.

17. The reactor of claim 9, wherein the operating motor operates at a speed of 3,500 rpm.

18. The reactor of claim 9, wherein the gearbox is a 17:1 gearbox that rotates at least one of the first shaft and the second shaft at 205 rpm.

* * * * *